(12) United States Patent
Kato et al.

(10) Patent No.: US 10,264,528 B2
(45) Date of Patent: Apr. 16, 2019

(54) PORTABLE TERMINAL APPARATUS

(71) Applicant: TOSHIBA TEC KABUSHIKI KAISHA, Tokyo (JP)

(72) Inventors: Masakazu Kato, Numazu Shizuoka (JP); Masahiro Kanagawa, Mishima Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 139 days.

(21) Appl. No.: 15/363,239

(22) Filed: Nov. 29, 2016

(65) Prior Publication Data

US 2017/0181087 A1 Jun. 22, 2017

(30) Foreign Application Priority Data

Dec. 16, 2015 (JP) ................................. 2015-244842

(51) Int. Cl.
| | |
|---|---|
| *H02J 7/00* | (2006.01) |
| *H04W 52/02* | (2009.01) |
| *H02J 7/02* | (2016.01) |
| *H04B 5/00* | (2006.01) |
| *H04W 12/06* | (2009.01) |
| *H02J 50/12* | (2016.01) |
| *H02J 50/80* | (2016.01) |
| *H04W 4/80* | (2018.01) |

(52) U.S. Cl.
CPC ......... *H04W 52/0229* (2013.01); *H02J 7/025* (2013.01); *H02J 50/12* (2016.02); *H02J 50/80* (2016.02); *H04B 5/0031* (2013.01); *H04W 4/80* (2018.02); *H04W 12/06* (2013.01)

(58) Field of Classification Search
CPC .................................. H02J 50/80; H02J 50/12
USPC .......................................................... 320/108
See application file for complete search history.

(56) References Cited

U.S. PATENT DOCUMENTS

| | | | | |
|---|---|---|---|---|
| 6,967,462 | B1 * | 11/2005 | Landis | H02J 17/00 320/101 |
| 8,457,656 | B2 * | 6/2013 | Perkins | G01S 5/0257 340/686.6 |
| 9,059,599 | B2 * | 6/2015 | Won | H02J 7/025 |
| 9,124,125 | B2 * | 9/2015 | Leabman | H02J 7/025 |
| 2010/0311327 | A1 | 12/2010 | Hamada | |
| 2012/0326660 | A1 * | 12/2012 | Lu | H02J 17/00 320/108 |
| 2014/0035521 | A1 | 2/2014 | Endo | |

(Continued)

*Primary Examiner* — Suchin Parihar
(74) *Attorney, Agent, or Firm* — Kim & Stewart LLP (57) ABSTRACT

A portable terminal apparatus according to an embodiment includes a power supply and a power receiving circuit that wirelessly receives electric power for charging the power supply. A first communication circuit transmits and receives information relating to receiving the electric power. A second communication circuit includes a communication antenna, a near field radio communication circuit and a switch arranged between the communication antenna and the near field radio communication circuit. The second communication circuit is selectively configured to communicate with a separate terminal device via near field radio communication. A controller controls the switch to disconnect the communication antenna from the near field radio communication circuit in response to the first communication circuit receiving the information relating to receiving the electric power.

20 Claims, 7 Drawing Sheets

(56) References Cited

U.S. PATENT DOCUMENTS

| | | | | |
|---|---|---|---|---|
| 2014/0055098 A1* | 2/2014 | Lee | ............. | H04B 5/0037 320/137 |
| 2014/0292090 A1* | 10/2014 | Cordeiro | ............. | H02J 17/00 307/104 |
| 2015/0171933 A1 | 6/2015 | Hamada | | |
| 2016/0013683 A1 | 1/2016 | Endo | | |

* cited by examiner

PORTABLE TERMINAL APPARATUS

CROSS-REFERENCE TO RELATED APPLICATION

This application is based upon and claims the benefit of priority from Japanese Patent Application No. 2015-244842, filed Dec. 16, 2015, the entire contents of which are incorporated herein by reference.

FIELD

Embodiments described herein relate generally to a portable terminal apparatus including a wireless charging function and a near field radio communication function.

BACKGROUND

A portable terminal apparatus such as a smart phone may have a wireless charging function. The portable terminal apparatus has a secondary battery and a circuit for charging the secondary battery therein with electronic power sent from a wireless charger. In order to carry out charging in a wireless manner, the portable terminal apparatus includes a power receiving coil, a power receiving circuit for receiving the electric power and a charging circuit for charging the secondary battery.

In wireless charging, the electric power may be transmitted through electromagnetic induction between a transmitting coil arranged in the wireless charger and the power receiving coil arranged in the portable terminal apparatus. Frequencies for transmitting the electric power are in a band of about 100 kHz~200 kHz.

Also, a near field radio communication technology called NFC (Near Field Communication) is used for transmitting data in a wireless manner. The near field radio communication technology carries out transmission of data between a transmission apparatus and the portable terminal apparatus at a distance equal to or less than about 10 cm.

The NFC in a band of 13.56 MHz may be used. Communication is carried out by using electromagnetic induction between an antenna for communication arranged in the transmission apparatus and an antenna for communication arranged in the portable terminal apparatus. A communicable distance of the NFC may be as short as about 10 cm. The NFC generally carries out communication when the portable terminal apparatus is held over, placed on or placed close to the transmission apparatus.

A portable terminal apparatus may be equipped with both the wireless charging function and the NFC function. As noted, frequencies for wireless charging are 100 kHz~200 kHz, and frequencies for NFC is 13.56 MHz, which are very different. As there is difference in the frequencies, the wireless charging and the NFC almost never interfere with each other. As there is no interference, it is possible to carry out data communication through the NFC while carrying out the wireless charging.

Another method of wireless charging that is different from the electromagnetic induction is based on magnetic field coupling using a frequency of 6.78 MHz. It is expected that the portable terminal apparatus including the wireless charging function corresponding to 6.78 MHz will increase in popularity. Even in the portable terminal apparatus using the magnetic field coupling of 6.78 MHz for wireless charging, the NFC of 13.56 MHz is likely to be used.

Many harmonic components are generated from a power transmission device for wireless charging using 6.78 MHz. In particular, a second harmonic is a 13.56 MHz, which coincides with the frequency of 13.56 MHz used in the NFC. Output for the wireless charging is very large (for example, around 10 W to several tens of W) compared to the output of the NFC for the purpose of transmitting the electric power. For this reason, if the portable terminal apparatus including the wireless charging function and the NFC function approaches the wireless charger, electric power with a large value that exceeds rating of an IC chip for NFC in the portable terminal apparatus is input. Because of the electric power exceeding the rating, there is a possibility that failure occurs in the IC chip for NFC and peripheral circuits thereof.

DETAILED DESCRIPTION

A portable terminal apparatus according to an embodiment includes a power supply and a power receiving circuit that wirelessly receives electric power for charging the power supply. A first communication circuit transmits and receives information relating to receiving the electric power. A second communication circuit includes a communication antenna, a near field radio communication circuit and a switch arranged between the communication antenna and the near field radio communication circuit. The second communication circuit is selectively configured to communicate with a separate terminal device via near field radio communication. A controller controls the switch to disconnect the communication antenna from the near field radio communication circuit based on the first communication circuit receiving the information relating to receiving the electric power.

Hereinafter, embodiments are described with reference to the accompanying drawings. Further, the same component in each diagram is assigned with the same symbol.

First Embodiment

Figure 1:
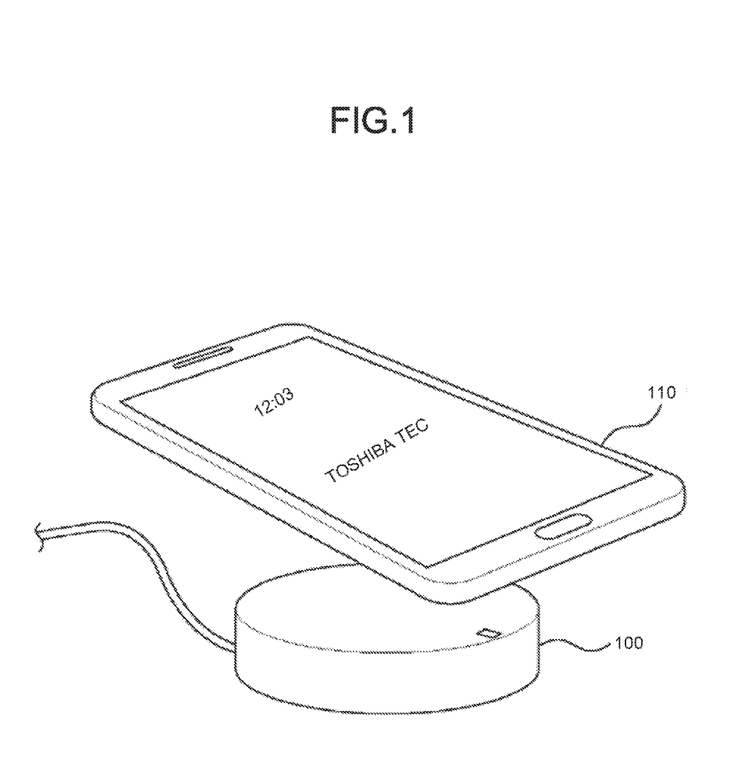
FIG. 1 is a diagram illustrating a wireless charger and a portable terminal apparatus according to a first embodiment.
Figure 2:
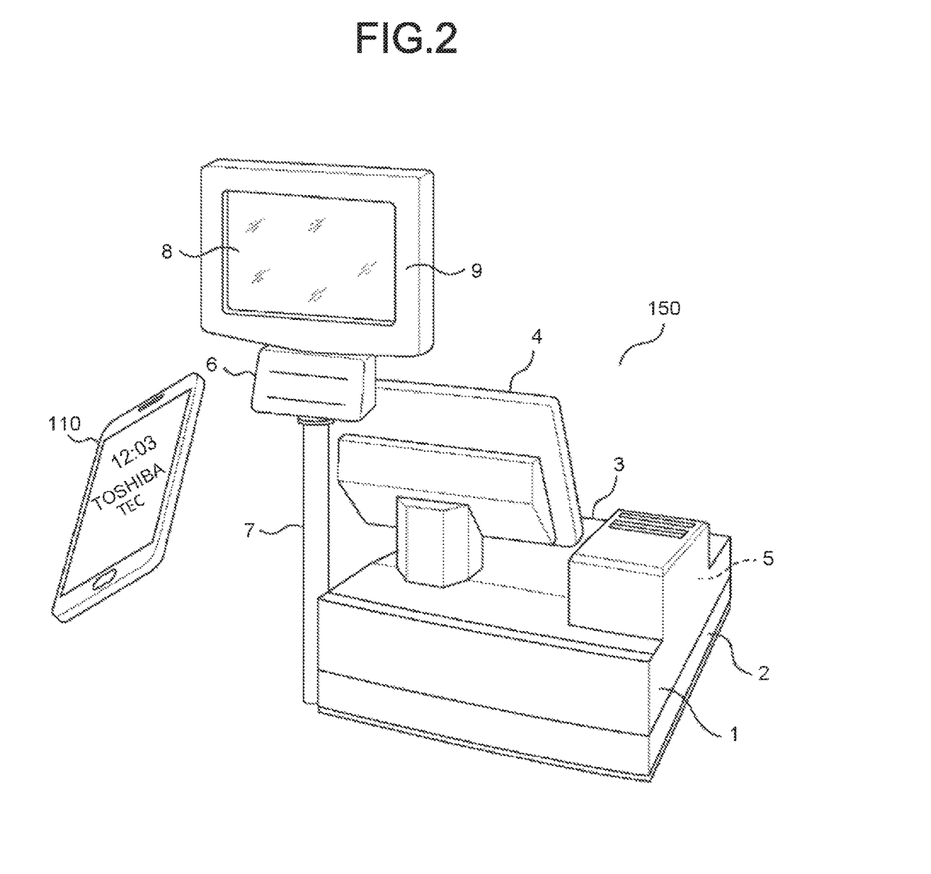
FIG. 2 is a diagram illustrating the portable terminal apparatus and a POS terminal according to the first embodiment.
Figure 3:
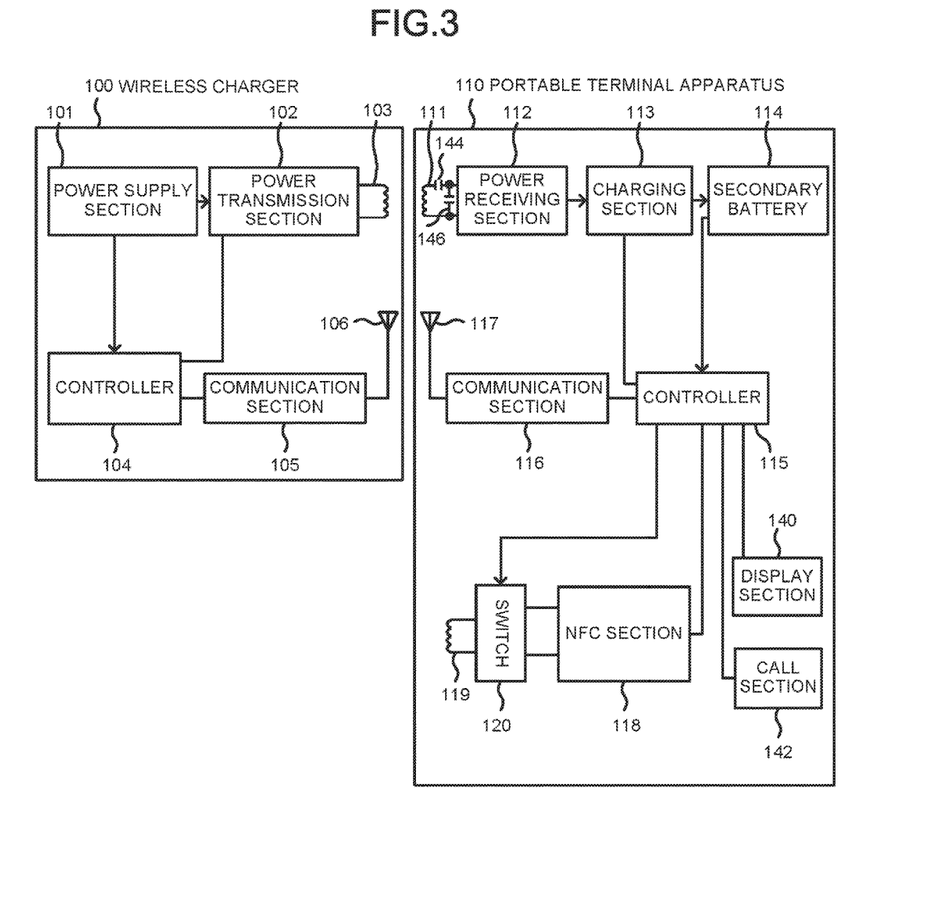
FIG. 3 is a block diagram illustrating an example configuration of the wireless charger and the portable terminal apparatus according to the first embodiment.

FIG. 1 is a diagram illustrating an example portable terminal apparatus 110 according to the first embodiment. The portable terminal apparatus 110 is placed on a wireless charger 100 or is arranged in proximity to the wireless charger 100 in order to charge the portable terminal apparatus 110 in a wireless manner. FIG. 2 is a diagram illustrating an example in which the portable terminal apparatus 110 is positioned close to a POS terminal 150 to communicate via NFC, as will be described later. FIG. 3 is a block diagram illustrating an example configuration of the wireless charger 100 and the portable terminal apparatus 110.

The wireless charger 100 includes a power supply circuit 101, a power transmission circuit 102 that generates a high-frequency electric power, a power transmission coil 103 that transmits the electric power, a controller 104 that controls each circuit, a communication circuit 105 and an antenna 106 for communication. The power supply circuit 101 is supplied with the electric power from an AC adapter and supplies the electric power suitable to each circuit of the wireless charger. The controller 104 is, for example, a microprocessor.

The portable terminal apparatus 110 includes a power receiving coil 111 that is magnetically coupled with the power transmission coil 103 to receive the electric power, a power receiving circuit 112, a charging circuit 113 for charging the secondary battery 114 and a controller 115 (such as a microprocessor) for controlling each circuit. The portable terminal apparatus 110 further includes a communication circuit 116 for communicating with the communication circuit 105 of the wireless charger 100, an antenna 117 for communication, an NFC circuit 118 and an antenna 119 (such as an integrated circuit (IC) for NFC) for carrying out near field radio communication (NFC). A switch 120 is arranged between the antenna 119 and the NFC circuit 118 of the portable terminal apparatus 110. An on state and an off state of the switch 120 are switched through a control signal output by the controller 115. A first communication circuit includes the communication circuit 116 and the antenna 117. A second communication circuit includes the NFC circuit 118, the antenna 119, and the switch 120. The portable terminal apparatus 110 includes a display section 140 and a call section 142 as functional sections of a mobile terminal in addition to the wireless charging section and the communication section.

The power receiving circuit 112 receives the electric power of 6.78 MHz generated by the power transmission circuit 102 of the wireless charger 100. A capacitor 144 arranged in series with the power receiving coil 111 and a capacitor 146 arranged in parallel with the power receiving coil 111 resonate with 6.78 MHz. By utilizing resonance phenomenon of 6.78 MHz, the electric power transmitted from the power transmission coil 103 can be received even at a distance of up to several tens of cm. Alternatively, instead of the combination of the capacitors 144 and 146 of the present embodiment, only the power receiving coil 111 or only one of the capacitors may be arranged in series and in parallel with the power receiving coil 111 and caused to resonate with 6.78 MHz.

The communication circuit 105 of the wireless charger 100 and the communication circuit 116 of the portable terminal apparatus 110 are arranged to carry out communication between the wireless charger 100 and the portable terminal apparatus 110. The communicated information includes, for example, information indicating that the portable terminal apparatus 110 is placed on the wireless charger 100, authentication information for specifying ID of the portable terminal apparatus, information necessary for the power transmission such as received power amount and power transmission efficiency and the like. The communication circuit 105 and the communication circuit 116 communicate with each other via the antennas 106 and 117 through the near field radio communication circuit which uses 2.4 GHz band having a communication distance of about 10 meters.

The communication between the communication circuit 105 and the communication circuit 116 uses the frequency of 2.4 GHz band which is largely different from a power transmission frequency of 6.78 MHz band. Thus, the communication is difficult to be affected by the influence of the power transmission frequency at the time of the power transmission. Therefore, it is possible to carry out the communication with high reliability between the communication circuit 105 and the communication circuit 116. The frequency of 2.4 GHz band is exemplified, but the frequency is not limited to 2.4 GHz band. For example, a communication system using a wireless LAN instead of the near field radio communication circuit can also be utilized.

The NFC is a small power radio communication technology capable of carrying out communication at a distance of up to several tens of cm. The NFC circuit 118 carries out communication at the frequency of 13.56 MHz and carries out communication with a transmission apparatus corresponding to the NFC function.

An example of using the NFC function is to execute processing of prepaid type electronic money. The portable terminal apparatus 110 has the NFC circuit 118 for communicating information of the electronic money. In a store, a POS terminal has a transmission and reception device corresponding to the NFC function. The transmission and reception device is used to realize payment by the portable terminal apparatus having an electronic money function and the NFC function. At the time of shopping, a customer may complete the payment by holding the portable terminal apparatus over a communication device of the POS terminal. The NFC communication is carried out in such a manner that the portable terminal apparatus having the electronic money function is enabled to be held over or close to the communication device. The NFC function is not limited to being used in the payment by the POS terminal. As another example, the NFC function is also used in examination of tickets of the railway and automatic settlement at the time of getting on and off the bus.

FIG. 2 is an example of carrying out processing of the electronic money by holding the portable terminal apparatus 110 over the vicinity of the POS terminal 150. The POS terminal 150 includes a keyboard 3 on which various keys for commodity sales registration are arranged at the front side of an upper surface of the main body 1. The POS terminal 150 includes a front side display device 4 for displaying names and amount of registered sales commodities to an operator at the front surface of the main body 1. Further, a printer 5 for printing a receipt or the like is built in the main body 1. The printer 5 prints the receipt. The POS terminal 150 includes a customer-side display device 8 for displaying names and amount of the registered sales commodities to the communication device 6 corresponding to the NFC function and the customer. The near field radio communication is carried out when the portable terminal apparatus 110 is held near the communication device 6. The processing of the electronic money through the near field radio communication is carried out via the NFC circuit 118 of the portable terminal apparatus 110 and the communication device 6 on the POS terminal.

The frequency used in the NFC is 13.56 MHz. If 6.78 MHz (which is half of 13.56 MHz) is used as the frequency of the wireless charging, radio waves of the wireless charging and radio waves of the NFC may interfere with each other in some cases. Through radio wave interference, a signal of large electric power is input from the wireless charger to the NFC circuit 118, and failure is possible to occur.

The radio wave interference is described in detail. If the wireless charger 100 transmits the electric power to the portable terminal apparatus 110 at the frequency of 6.78 MHz, a harmonic wave is generated in the power transmission circuit 102. The fundamental wave component of 6.78 MHz and the harmonic component thereof are radiated from the power transmission coil 103. The frequency of 13.56 MHz used in the NFC becomes the harmonic wave which is just twice as large as of the frequency of 6.78 MHz. The electric power of the harmonic wave component 13.56 MHz radiated from the power transmission coil 103 is received by the antenna 119 for NFC to be supplied to the NFC circuit 118.

As the portable terminal apparatus 110 such as a smart phone is small, it is assumed that the power transmission coil 103 is close to the antenna 119. In order to transmit the electric power in a wireless manner, the wireless charger 100 must transmit large electric power—which is generally 10 W or several tens of W—from the power transmission coil 103. However, it is not intended that the large electric power from 10 W to several tens of W is received by the NFC, and the electric power received by the NFC is generally about 1 W. Thus, failure may occur if a signal of the large electric power which exceeds the rating is input to the NFC circuit 118.

In the present embodiment, the switch 120 is arranged between the antenna 119 and the NFC circuit 118 of the portable terminal apparatus 110 to avoid the failure of the NFC circuit.

The switch 120 is controlled by the controller 115 to be in an on state or an off state. The control method is described with reference to the flowchart in FIG. 4.

Figure 4:
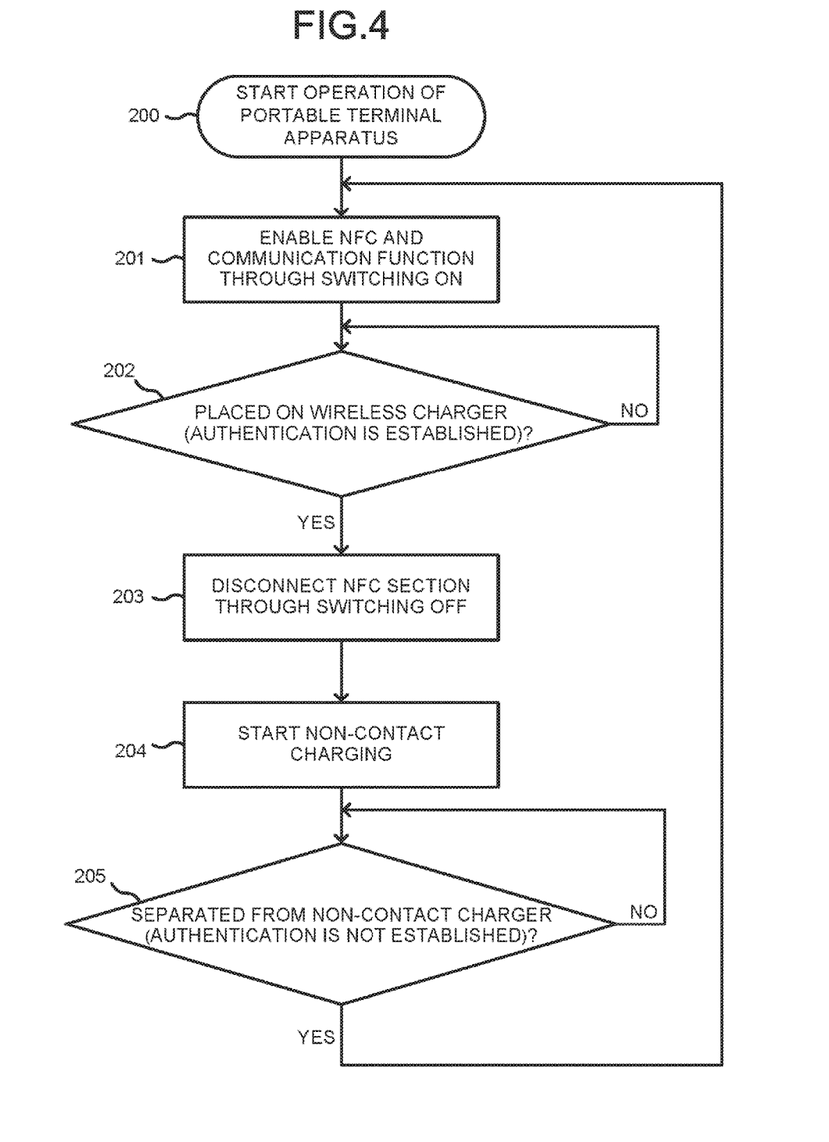
FIG. 4 is a flowchart illustrating example operations of the portable terminal apparatus.

If the operation of the portable terminal apparatus 110 is started (Act 200), the controller 115 turns on the switch 120 to enable the NFC function. At the same time, the controller 115 also turns on the communication circuit 116 to enable the communication function by the communication circuit 116 (Act 201). In this state, the NFC function such as the electronic money is enabled.

Next, the controller confirms whether the portable terminal apparatus 110 is placed on or close to the wireless charger 100 (Act 202). When the portable terminal apparatus 110 is placed on the wireless charger 100, an authentication operation is carried out through the communication between the communication circuits 105 and 116, and the controller 104 of the wireless charger 100 recognizes that the portable terminal apparatus 110 is placed thereon. In other words, the authentication is established. As the same time, the controller of the portable terminal apparatus 110 recognizes that the portable terminal apparatus 110 is placed on the wireless charger 100.

When the controller 115 recognizes that the portable terminal apparatus 110 is placed on the wireless charger 100 (YES in Act 202), the controller 115 turns off the switch 120 and disconnects the antenna 119 and the NFC circuit 118 (Act 203). The switch may be electrically disconnected by using FET or the like, or may be physically disconnected by using a mechanical switch.

Then, the wireless charger 100 starts to transmit the electric power (Act 204), and the portable terminal apparatus 110 receives the electric power in a wireless manner to charge the secondary battery 114.

If it is detected that the portable terminal apparatus 110 is separated from the wireless charger 100 through the communication between the communication circuits 105 and 116 (Act 205), the controller 115 turns on the switch 120 again. As a result, the antenna 119 is re-connected with the NFC circuit 118 to enable the NFC function.

The control for turning off the switch 120 is carried out in a case in which the portable terminal apparatus 110 is placed on the wireless charger 100 or close to the wireless charger 100 at a wireless chargeable distance.

However, depending on surrounding environment of the wireless charger 100 and the portable terminal apparatus 110, the communication distance between the communication circuits 105 and 116 usually reaches several tens of meters. As the communication distance extends, even in a state in which the portable terminal apparatus 110 does not approach the wireless charger 100, the control for turning off the switch 120 may occur, which is undesirable. It is necessary to avoid that malfunction and accurately detect that the portable terminal apparatus 110 is placed on or close to the wireless charger 100.

In order to accurately detect that the portable terminal apparatus 110 is placed on or close to the wireless charger 100, the electric power of the communication circuit 116 of the portable terminal apparatus 110 is supplied via the power receiving circuit 112 while the determination and authentication takes place through the communication circuits 105 and 116. The controller 115 detects whether or not the power receiving circuit 112 receives the electric power from the power transmission circuit 102. Then the controller 115 determines that the portable terminal apparatus 110 is close to the wireless charger 100 if the power receiving circuit 112 receives the electric power.

The wireless charger 100 transmits a small magnitude electric power until the authentication through the communication circuits 105 and 116 is completed. When only a small magnitude electric power is transmitted, input of the large electric power to the NFC circuit 118 while the switch 120 is turned on can be avoided. After the completion of the authentication and after the switch 120 is turned off, the wireless charger 100 transmits the large magnitude wireless chargeable electric power to the portable terminal apparatus 110.

As stated above, in a state in which the portable terminal apparatus 110 is placed on or close to the wireless charger 100, the NFC circuit 118 is disconnected from the antenna 119 for NFC. Because the NFC circuit 118 is disconnected from the antenna 119 for NFC, the large electric power transmitted from the wireless charger 100 is not input to the NFC circuit 118. Thus, even in a case of carrying out the wireless charging to the portable terminal apparatus 110 including the NFC function, the failure does not occur in the NFC circuit 118.

Second Embodiment

Figure 5:
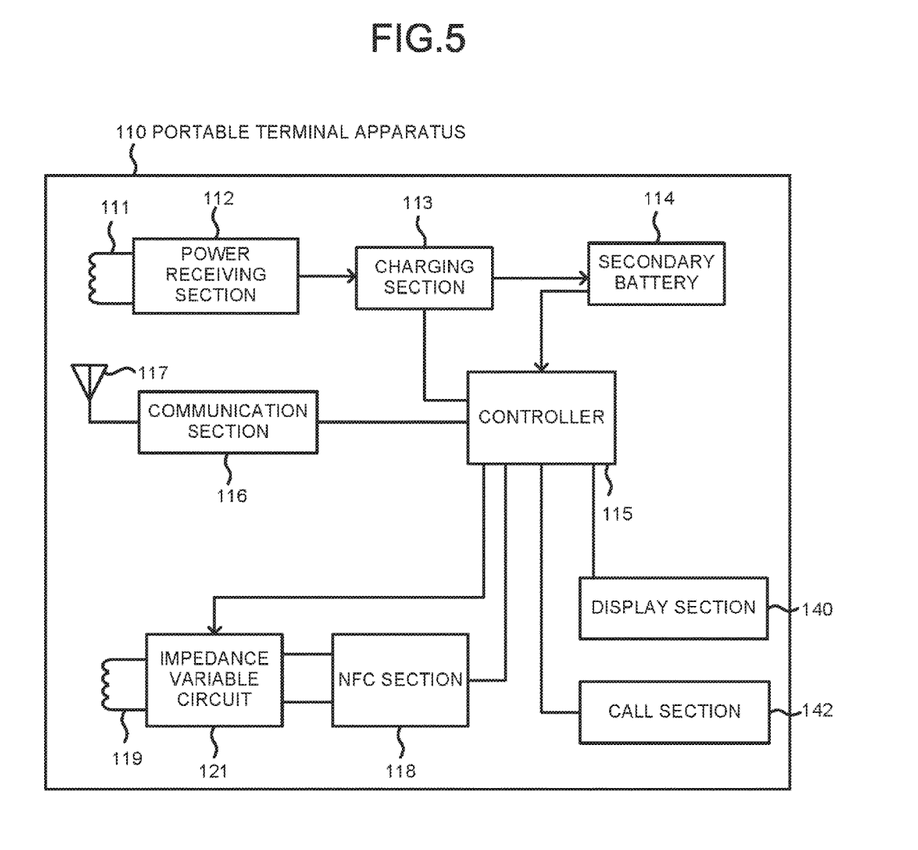
FIG. 5 is a block diagram illustrating an example configuration of a portable terminal apparatus according to a second embodiment.

The second embodiment is described with reference to FIG. 5 to FIG. 7. In the second embodiment, the configuration of the wireless charger 100 is the same as that of the wireless charger 100 of the first embodiment. The basic configuration and operations of the portable terminal apparatus 110 are the same as those of the portable terminal apparatus 110 of the first embodiment. In the second embodiment, the portable terminal apparatus 110 includes an impedance variable circuit 121 instead of the switch 120.

The portable terminal apparatus 110 is equipped with the impedance variable circuit 121 capable of changing impedance based on a control signal from the controller 115 between the antenna 119 for NFC and the NFC circuit 118.

Figure 6:
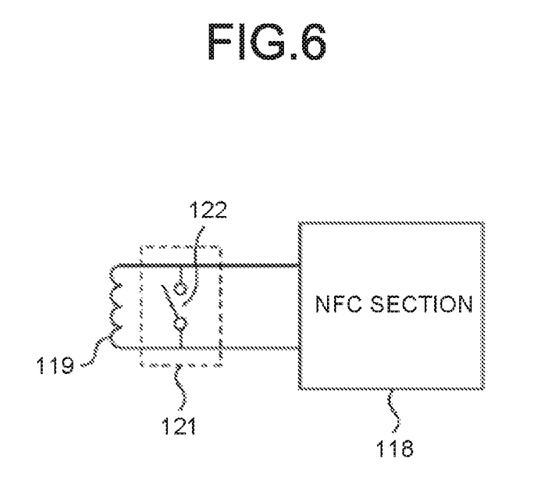
FIG. 6 is a diagram of an example impedance variable circuit according to the second embodiment.

As shown in FIG. 6, the impedance variable circuit 121 includes a switch 122. Generally, as the switch 122 has high impedance in the off state, the switch 122 makes no influence on the impedance of the antenna 119. Thus, if the antenna 119 for NFC is close to the antenna of the transmission apparatus of the NFC, data communication by the NFC can be executed.

If it is detected that the portable terminal apparatus 110 is placed on or close to the wireless charger 100, the controller 115 turns on the switch 122. At the time of the on state, the switch 122 is closed, and the impedance at the time of viewing the antenna 119 side from the NFC circuit 118 is low impedance. As a result, an impedance value at the normal time at which the portable terminal apparatus 110 is separated from the wireless charger 100 and an impedance value at the time the portable terminal apparatus 110 is placed on or close to the wireless charger 100 greatly vary.

At the time the impedance variable circuit 121 becomes low impedance, the signal is hardly received via the antenna 119. As a result, even in a state in which the portable terminal apparatus 110 is placed on the wireless charger 100, the large electric power is not input to the NFC circuit 118.

Figure 7:
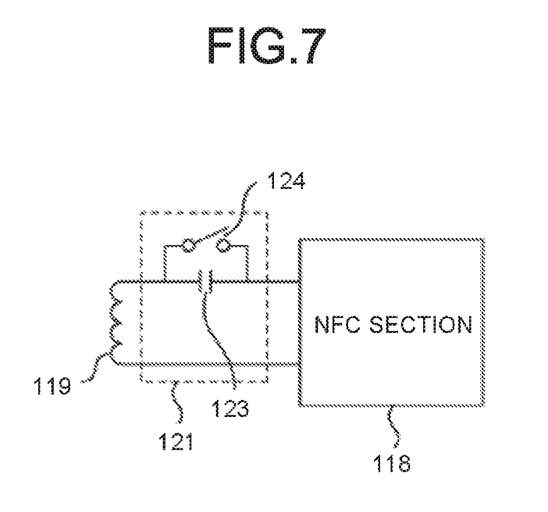
FIG. 7 is another diagram of the impedance variable circuit according to the second embodiment.

FIG. 7 is a diagram illustrating another configuration of the impedance variable circuit 121. The impedance variable circuit 121 includes a capacitor 123 in series with the antenna 119, and is configured to resonate with the frequency of 13.56 MHz used in the NFC communication. A switch 124 is arranged in parallel with the capacitor 123, and the controller 115 controls to turn on or turn off the switch 124 to change the impedance.

At the normal time at which the portable terminal apparatus 110 is separated from the wireless charger 100, the switch 124 is turned off, and the antenna 119 and the capacitor 123 resonate with 13.56 MHz, thus, the signal for NFC is efficiently received. If it is detected that the portable terminal apparatus 110 is placed on or close to the wireless charger 100, the controller 115 turns on the switch 122, the resonance frequency of the antenna 119 is largely deviated from 13.56 MHz. Further, the resonance frequency of the antenna 119 is also largely deviated from the frequency of 6.78 MHz transmitted by the wireless charger 100.

Through the impedance variable circuit 121 shown in FIG. 6 or FIG. 7, 6.78 MHz serves as frequency of power transmission to the NFC circuit 118, and 13.56 MHz as the harmonic wave thereof is substantially not input to the NFC circuit 118. As a result, the failure due to the input of the large electric power does not occur in the NFC circuit 118.

The configuration of the impedance variable circuit 121 mentioned above is an example, and the impedance variable circuit is not limited to the foregoing configuration. For example, in FIG. 7, the configuration in which the antenna 119 is arranged in series with the capacitor 123 is exemplified. However, the antenna 119 may also be arranged in parallel with the capacitor for resonance. The switch may also be arranged in parallel with the capacitor for resonance.

Third Embodiment

Figure 8:
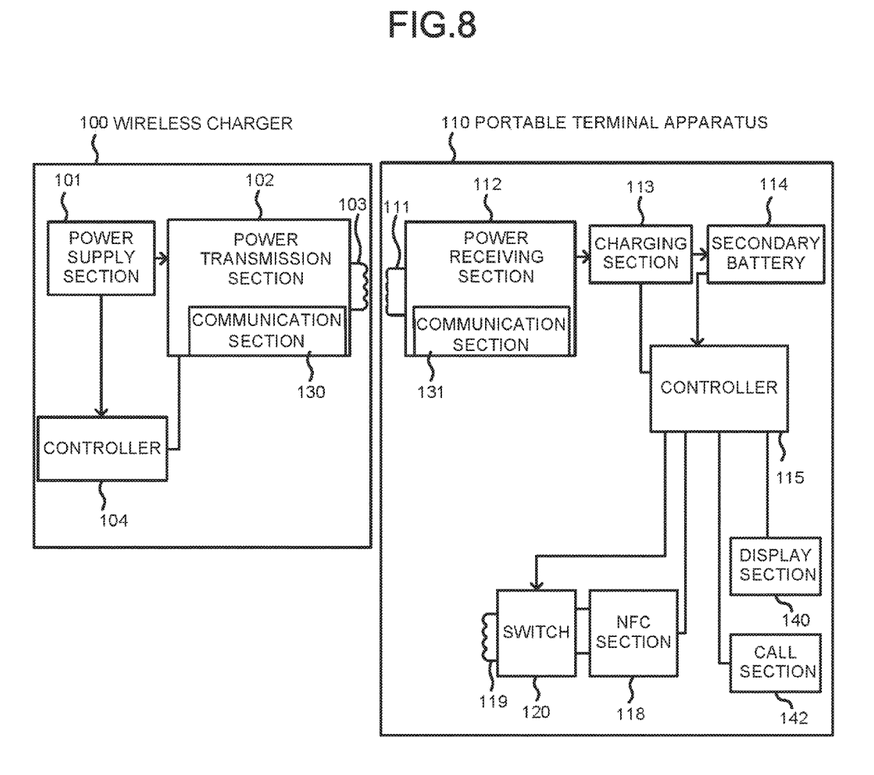
FIG. 8 is a block diagram illustrating an example configuration of a wireless charger and a portable terminal apparatus according to a third embodiment.

The third embodiment is described with reference to FIG. 8. In the third embodiment, the basic configuration and operations are the same as those of the first embodiment, except as explained below.

A communication circuit 130 of the wireless charger 100 is arranged in the power transmission circuit 102, and a communication circuit 131 of the portable terminal apparatus 110 is arranged in the power receiving circuit 112. The antennas 106 and 117 for communication are not necessary. The power transmission coil 103 of the wireless charger 100 is shared by the power transmission circuit 102 and the communication circuit 130. The power receiving coil 111 of the portable terminal apparatus 110 is shared by the power receiving circuit 112 and the communication circuit 131. The antenna 106 included in the wireless charger 100 and the antenna 117 included in the portable terminal apparatus 110 of the first and the second embodiments are not necessary.

A load modulation method is used as a communication method. The transmission frequency of the electric power is set as a carrier frequency, and load modulation is carried out on the carrier frequency at a slow transmission speed, for example, equal to or slower than several kbps, thus, it is possible to communicate necessary information between the communication circuit 130 of the power transmission circuit 102 and the communication circuit 131 of the power receiving circuit 112. Further, the communication method based on the load modulation method is also applicable to the first and the second embodiments.

For the communication circuits 130 and 131 to execute communication through load modulation via the power transmission coil 103 and the power receiving coil 111, the power transmission coil 103 and the power receiving coil 111 must be arranged in a position relationship capable of executing the power transmission, for example, at a distance of no more than several cm.

When the authentication by the communication circuits 130 and 131 is established, the power transmission coil 103 is necessarily already close to the power receiving coil 111, and the power transmission coil 103 is also close to the antenna 119 for NFC. Thus, t the large electric power is prevented from being input to the NFC circuit 118 at the time of the communication through the load modulation. At the time of executing the communication (equivalent to Act 202 in FIG. 2) and before the start of the wireless charging, amount of the electric power output by the wireless charger 100 is reduced to a range in which the amount of the electric power makes no influence on the NFC circuit 118.

In the embodiments described above, the frequency at which the wireless charger 100 transmits the electric power is described as 6.78 MHz; however, the frequency is not limited to 6.78 MHz. The power transmission can be executed at other frequencies. For example, the power transmission frequency may be set to 13.56 MHz, which is the same as that used in the NFC.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. A portable terminal apparatus, comprising:
   a power supply;
   a power receiving circuit configured to wirelessly receive electric power for charging the power supply;
   a first communication circuit configured to transmit and receive information relating to receiving the electric power;
   a second communication circuit including a communication antenna, a near field radio communication circuit and a switch arranged between the communication antenna and the near field radio communication circuit; and a controller configured to control the switch to disconnect the communication antenna from the near field radio communication circuit in response to the first communication circuit receiving the information relating to receiving the electric power.

2. The portable terminal apparatus according to claim 1, wherein the first communication circuit transmits and receives the information relating to receiving the electric power during an authentication operation.

3. The portable terminal apparatus according to claim 2, wherein the power receiving circuit wirelessly receives the electric power at a first magnitude before the authentication operation is complete, and wirelessly receives the electric power at a second magnitude greater than the first magnitude after the authentication operation is complete.

4. The portable terminal apparatus according to claim 3, wherein the controller is further configured to control the switch to disconnect the communication antenna from the near field radio communication circuit after the authentication operation is complete and before the power receiving circuit wirelessly receives the electric power at the second magnitude.

5. The portable terminal apparatus according to claim 1, wherein the first communication circuit transmits and receives the information relating to receiving the electric power through the power receiving circuit.

6. The portable terminal apparatus according to claim 1, wherein:
the power receiving circuit includes a receiving coil and the first communication circuit, and
the first communication circuit transmits and receives the information relating to receiving the electric power through the receiving coil via load modulation.

7. A portable terminal apparatus, comprising:
a power supply;
a power receiving circuit configured to wirelessly receive electric power for charging the power supply;
a first communication circuit configured to transmit and receive information relating to receiving the electric power;
a second communication circuit including a communication antenna, a near field radio communication circuit and a switch arranged between the communication antenna and the near field radio communication circuit; and
a controller configured to control the switch to substantially prevent the near field radio communication circuit from wirelessly receiving the electric power in response to the first communication circuit receiving the information relating to receiving the electric power.

8. The portable terminal apparatus according to claim 7, wherein the first communication circuit transmits and receives the information relating to receiving the electric power during an authentication operation.

9. The portable terminal apparatus according to claim 8, wherein the power receiving circuit wirelessly receives the electric power at a first magnitude before the authentication operation is complete, and wirelessly receives the electric power at a second magnitude greater than the first magnitude after the authentication operation is complete.

10. The portable terminal apparatus according to claim 9, wherein the controller is further configured to control the switch to substantially prevent the near field radio communication circuit from wirelessly receiving the electric power after the authentication operation is complete and before the power receiving circuit wirelessly receives the electric power at the second magnitude.

11. The portable terminal apparatus according to claim 7, wherein the first communication circuit transmits and receives the information relating to receiving the electric power through the power receiving circuit.

12. The portable terminal apparatus according to claim 7, wherein:
the power receiving circuit includes a receiving coil and the first communication circuit, and
the first communication circuit transmits and receives the information relating to receiving the electric power through the receiving coil via load modulation.

13. The portable terminal apparatus according to claim 7, wherein the switch is controlled to change a resonant frequency of the second communication circuit.

14. The portable terminal apparatus according to claim 13, wherein:
when the second communication circuit communicates with a separate terminal device via near field radio communication, the second communication circuit resonates at a harmonic of the resonant frequency of the power receiving circuit, and
when the switch is controlled to substantially prevent the near field radio communication circuit from wirelessly receiving the electric power, the second communication circuit does not resonate at a harmonic of the resonant frequency of the power receiving circuit.

15. A portable terminal apparatus, comprising:
a power supply;
a power receiving circuit configured to wirelessly receive electric power for charging the power supply;
a first communication circuit configured to transmit and receive information relating to receiving the electric power;
a second communication circuit including a communication antenna, a near field radio communication circuit and an impedance variable circuit that changes impedance, wherein the impedance variable circuit is arranged between the communication antenna and the near field radio communication circuit; and
a controller configured to change impedance of the impedance variable circuit in response to the first communication circuit receiving the information relating to receiving the electric power.

16. The portable terminal apparatus according to claim 15, wherein
the impedance variable circuit includes a switch arranged in parallel with the communication antenna, and
the controller is configured to cause the impedance variable circuit to have a low impedance if the power receiving circuit starts wirelessly receiving the electric power.

17. The portable terminal apparatus according to claim 15, wherein
the impedance variable circuit includes a capacitor arranged in series with the communication antenna, and a switch arranged in parallel with the capacitor, and
the controller is configured to cause the impedance variable circuit to have a low impedance if the power receiving circuit starts wirelessly receiving the electric power.

18. The portable terminal apparatus according to claim 17, wherein the controller controls the impedance variable circuit to resonate at a harmonic of the frequency used in the near field radio communication when the power receiving circuit is not wirelessly receiving the electric power, and controls the impedance variable circuit to not resonate at a harmonic of the frequency of the communication antenna from resonance frequency when the power receiving circuit is wirelessly receiving the electric power.

19. The portable terminal apparatus according to claim 15, wherein the first communication circuit transmits and receives the information relating to receiving the electric power through the power receiving circuit.

20. The portable terminal apparatus according to claim 15, wherein:
    the power receiving circuit includes a receiving coil and the first communication circuit, and
    the first communication circuit transmits and receives the information relating to receiving the electric power through the receiving coil via load modulation.

* * * * *